United States Patent [19]

Ookawa

[11] Patent Number: 4,691,250
[45] Date of Patent: Sep. 1, 1987

[54] MAGNETIC VIDEO REPRODUCER WITH REVERSELY RECORDED CUE TRACK

[75] Inventor: Katsuhiro Ookawa, Nagaokakyo, Japan

[73] Assignee: Mitsubishi Denki Kabushiki Kaisha, Tokyo, Japan

[21] Appl. No.: 671,981

[22] Filed: Nov. 15, 1984

[30] Foreign Application Priority Data

Nov. 26, 1983 [JP] Japan ............................. 58-222681

[51] Int. Cl.$^4$ ..................... H04N 5/782; G11B 27/08; G11B 27/32
[52] U.S. Cl. .................................. 360/14.1; 360/14.2; 360/72.1; 360/72.2; 360/74.4; 360/70
[58] Field of Search ................... 360/10.2, 10.3, 14.1, 360/14.2, 72.1, 72.2, 73, 74.1, 74.4, 77, 70; 358/311

[56] References Cited

U.S. PATENT DOCUMENTS

| | | | |
|---|---|---|---|
| 3,663,766 | 5/1972 | Goto ................................. | 360/10.1 |
| 3,890,639 | 6/1975 | O'Donnell et al. ................ | 360/14.1 |
| 4,297,733 | 10/1981 | Sanderson ........................ | 360/77 |
| 4,358,797 | 11/1982 | Nishijima et al. ................. | 360/73 |
| 4,363,048 | 12/1982 | Tanaka et al. .................... | 360/14.2 X |
| 4,463,391 | 7/1984 | Takano et al. ..................... | 360/14.2 |
| 4,482,926 | 11/1984 | Nishijima et al. ................. | 360/14.2 |
| 4,488,185 | 12/1984 | Toba ................................. | 360/14.2 X |
| 4,520,406 | 5/1985 | Suzuki et al. ..................... | 360/14.2 |

FOREIGN PATENT DOCUMENTS

| | | |
|---|---|---|
| 49-18805 | 5/1974 | Japan . |
| 59-31795 | 8/1984 | Japan . |
| 554625 | 9/1974 | Switzerland . |
| 1443806 | 7/1976 | United Kingdom . |
| 1443105 | 7/1976 | United Kingdom . |

OTHER PUBLICATIONS

Schneidemeister–Test Videorecorder, p. 9, Sep. 1982 and English translation.
Das Band-, Kopfservo-und Spurnachfuhrungs-system (DTF) des Video 2×4, W. Kornhass Grundig-Technische Informationen 1980.

Primary Examiner—Raymond F. Cardillo
Assistant Examiner—Wayne R. Young
Attorney, Agent, or Firm—Lowe Price LeBlanc Becker & Shur

[57] ABSTRACT

A magnetic video reproducer outputs a plurality of pilot signals having different frequencies from a servo circuit (18) in a recording mode, to superpose the pilot signals on video signals outputted from a signal circuit (25) and record the same on video tracks provided on a magnetic tape. In shifting a mode from the recording mode to a stop mode including a pause mode, a capstan motor (19) and a reel motor (20) are reversely rotated so that a cue signal is recorded by a cue head (10) on the magnetic tape in the form of a pulse train, whereafter travelling of the magnetic tape is stopped. When the stop mode is released, a CPU (170) determines whether or not pilot signals reproduced by reverse transfer of the magnetic tape and pilot signals to be newly recorded coincide with each other in frequency and in phase to reproduce the cue signal upon a determination of coincidence, so as to re-start recording operation when the reproduced cue signal is correlated with the cue signal recorded in shifting to the stop mode, thereby to perform program search for a recording starting position.

13 Claims, 12 Drawing Figures

MAGNETIC VIDEO REPRODUCER WITH REVERSELY RECORDED CUE TRACK

BACKGROUND OF THE INVENTION

1. Field of the Invention

The present invention relates to a magnetic video reproducer. More specifically, it relates to a magnetic video reproducer applicable to a video tape recorder in which a cue track is provided on the magnetic tape separately from video tracks for recording cue signals.

2. Description of the Prior Art

In a conventional magnetic video reproducer, there is employed a method in which four pilot signals having frequencies different from each other are superposed on video signals to be recorded in a magnetic tape, thereby to control reading positions of a video head based on the pilot signals. Such a control method is well known in the art by Dutch patent application No. 7702815 filed on Mar. 16, 1977 in the name of Hendrick, entitled "Method of and apparatus for controlling positions of writing and reading heads". A further teaching of recording on magnetic tape a composite signal including both video signals and pilot signals is disclosed in U.S. Pat. No. 4,297,733, incorporated herein by reference.

Figure 1:
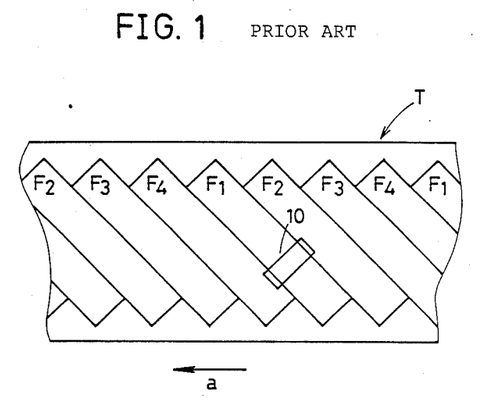
FIG. 1 is an illustration showing a recording state of a magnetic tape in a conventional magnetic video reproducer of a pilot signal control system.

FIG. 1 is illustrative of video tracks provided on a magnetic tape T slantingly along the longitudinal direction thereof and pilot signals recorded on the respective video tracks in superposition with video signals. Referring to FIG. 1, description is now made with respect to a method of controlling a video head in a conventional magnetic video reproducer.

In FIG. 1, the magnetic tape T travels in the direction shown by an arrow a, i.e., in the forward direction. On video tracks $F_1$, $F_2$, $F_3$ and $F_4$, there are recorded pilot signals of frequencies $f_1$, $f_2$, $f_3$ and $f_4$ respectively. The relation between the respective frequencies is represented as follows:

$$|f_2 - f_1| = |f_3 - f_4| = f_a$$

$$|f_1 - f_4| = |f_2 - f_3| = f_b$$

in which the relation $f_a \neq f_b$ is satisfied. It is assumed here that a magnetic head 10 is now tracking the video track $F_1$ on the magnetic tape T as shown in FIG. 1. The pilot signal component detected by the magnetic head 10 includes, in addition to the pilot signal of the frequency $f_1$ superposed on the video track $F_1$, the pilot signals superposed on the adjacent video tracks $F_2$ and $F_4$ by a side leading effect and crosstalk etc. The ratio of these pilot signals detected from the adjacent video tracks $F_2$ and $F_4$ is increased following an increase in displacement of the video track $F_1$ tracked by the magnetic head 10 from the central position.

Consequently, the aforementioned absolute values $|f_2 - f_1|$ and $|f_4 - f_1|$ are voltage-converted, whereby the direction of the tracking displacement of the magnetic head 10 is detected thereby to detect the amount of the subject displacement from the difference components. The detected error components are subjected to feedback to a servo circuit (not shown) to control travelling of the magnetic tape T.

Such a magnetic video reproducer in which the reading positions of the video tracks are controlled in the aforementioned manner has rapidly come into wide use, accompanied by multi-functionalization. In this regard, there is awaited implementation of a magnetic video reproducer which can perform program search for a recording starting position reliably in simple structure, though, no satisfactory device has been developed in practice.

SUMMARY OF THE INVENTION

Accordingly, an essential object of the present invention is to provide a magnetic video reproducer in which program search for a recording starting position is readily and reliably performed by a novel method employing linked recording means in which a cue signal in the form of a pulse train is recorded and reproduced on a cue track provided on a magnetic tape separately from video tracks.

According to the present invention, briefly stating, in a stop mode including a pause mode, the magnetic tape is transferred in the reverse direction from the position of stoppage of the same while a cue signal in the form of a pulse train of a predetermined number of pulses is recorded on a cue track provided on the magnetic tape by a cue head. Upon releasing of the stop mode, the magnetic tape is transferred in the forward direction so that, the pulse train recorded on the cue track is picked up by the cue head, thereby to re-start the recording operation when the number of the reproduced pulses is correlated with the number of the pulses recorded on the cue track during the reverse transfer of the magnetic tape.

Thus, since, according to the present invention, the recording starting position is detected based on the number and the period of a pulse train recorded on a cue track during reverse transfer of a magnetic tape, the structure is simplified and program search operation can be correctly performed even if the pulse train is irregular.

The above and other objects, features, aspects and advantages of the present invention will become more apparent from the following detailed description of the present invention when taken in conjunction with the accompanying drawings.

DESCRIPTION OF THE PREFERRED EMBODIMENT

Figure 2:
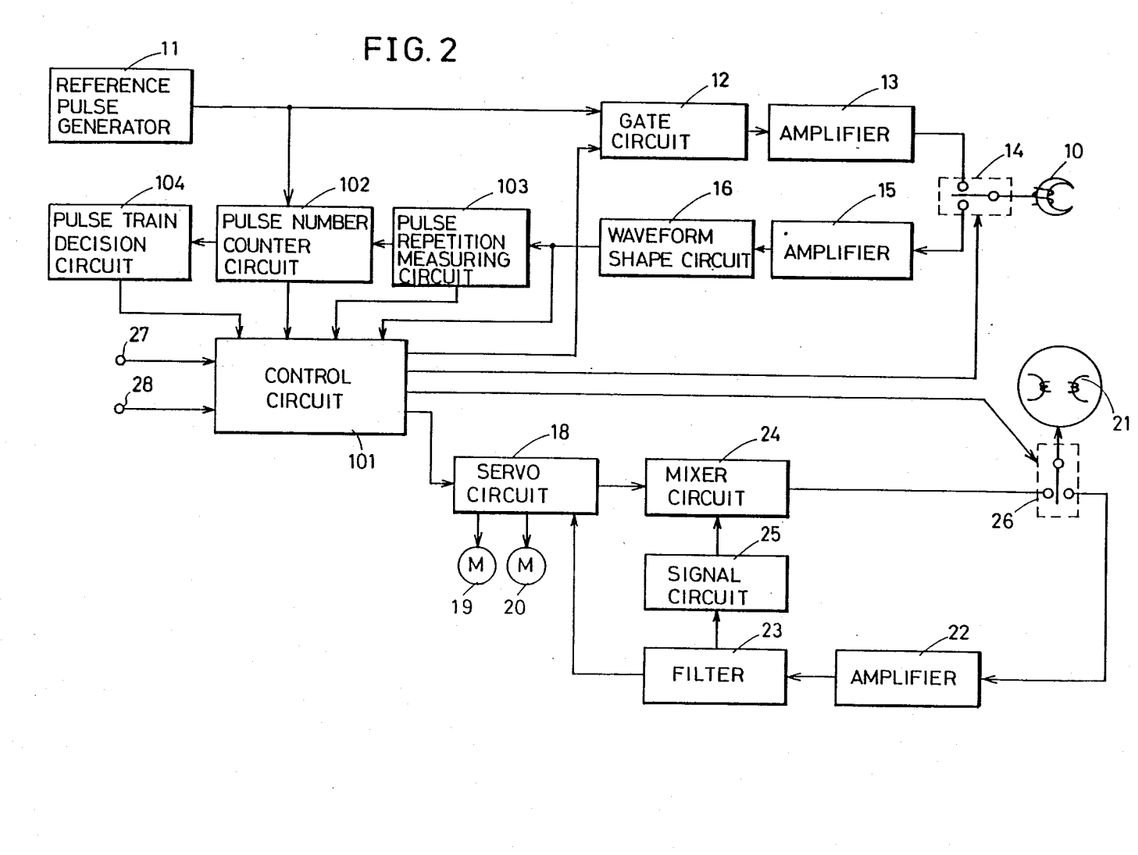
FIG. 2 is a roughly illustrated block diagram showing the entire structure of an embodiment of the present invention.

FIG. 2 is a roughly illustrated block diagram showing the entire structure of an embodiment of the present invention. Referring to FIG. 2, the structure of the present embodiment is now described. Based on a control signal from a control circuit 101, a servo circuit 18 controls a capstan motor 19 and a reel motor 20 while generating four pilot signals of frequencies $f_1$, $f_2$, $f_3$ and $f_4$ which are different from each other. These pilot signals are supplied to a mixer circuit 24, which receives video signals from a signal circuit 25. The mixer circuit 24 superposes the pilot signals on the video signals, to supply the same to a video head 21 through a switching circuit 26. The video head 21 records the video signals superposed with the pilot signals on video tracks on a magnetic tape.

In reproducing operation, the video signals superposed with the pilot signals are picked up by the video head 21, to be supplied to an amplifier 22 through the switching circuit 26. The amplifier 22 amplifies the video signals superposed with the pilot signals to supply the same to a filter 23. The filter 23 separates the video signals from the pilot signals, whereby the separated video signals are supplied to the signal circuit 25 while the pilot signals are supplied to the servo circuit 18.

A reference pulse generator 11 generates a pulse signal which functions as a cue signal. The pulse signal generated form the reference pulse generator 11 is supplied to a gate circuit 12 as well as to a control circuit 101. The gate of the gate circuit 12 is opened when recording in the magnetic tape is stopped and the magnetic tape is transferred in the reverse direction from the position of stoppage thereof. Upon opening of the gate of the gate circuit 12, the pulse signal from the reference pulse generator 11 is supplied to an amplifier 13 to be amplified therein, and is further supplied to a cue head 10 through a switching circuit 14. The cue head 10 records the pulse signal as a cue signal on a cue track on the magnetic tape, which is provided separately from video tracks. The cue signal is recorded in the form of a pulse train of at least three pulses.

When a stop mode including a pause mode is released, the cue head 10 picks up the cue signal recorded in the form of the pulse train on the magnetic tape. The cue signal is supplied to an amplifier 15 through the switching circuit 14, to be amplified therein and supplied to a waveform shape circuit 16. The waveform shape circuit 16 shapes the waveform of the pulse signal received in the form of the pulse train, to supply the waveform-shaped pulse signal to a pulse repetition measuring circuit 103 as well as to the control circuit 101. The pulse repetition measuring circuit 103 measures repetition of the waveform-shaped pulse signal, to supply the measured pulse repetition to the control circuit 101 while supplying the pulse signal subjected to the measurement to a pulse number counter circuit 102. The pulse number counter circuit 102 counts the pulse number of the pulse signal recorded in the cue track as well as the number of the pulses included in the reproduced cue signal, to supply the counter output to the control circuit 101. A pulse train decision circuit 104 decides the state of the pulse train based on the counter output of the pulse number counter circuit 102 and the pulse repetition measured by the pulse repetition measuring circuit 103. The decision output from the pulse train decision circuit 104 is supplied to the control circuit 101. The control circuit 101 receives a pause signal through an input terminal 27 as well as a head switching signal for switching timing of the video head 21 through an input terminal 28.

Referring to FIG. 2, principle operation of the present embodiment is now described. In the recording mode, the servo circuit 18 forwardly rotates the capstan motor 19 and the reel motor 20, thereby to transfer the magnetic tape in the forward direction. Simultaneously, the servo circuit 18 supplies the pilot signals to the mixer circuit 24. The mixer circuit 24 superposes the pilot signals on the video signals received from the signal circuit 25, to supply the superposed signals to the video head 21 through the switching circuit 26, whereby the signals are recorded on the video tracks on the magnetic tape. In a reproducing mode, the video head 21 picks up the video signals superposed with the pilot signals, to supply the picked-up video signals to the amplifier 22 through the switching circuit 26. The amplifier 22 amplifies the video signals to supply the same to the filter 23. The filter 23 separates the pilot signals from the video signals, to supply the pilot signals to the servo circuit 18 and supply the video signals to the signal circuit 25.

In the stop mode including a pause mode, the servo circuit 18 reversely rotates the capstan motor 19 and the reel motor 20. The control circuit 101 opens the gate of the gate circuit 12, to output the pulse signal in the form of a pulse train of at least three pulses generated from the reference pulse generator 11 as the cue signal. The cue signal is amplified by the amplifier 13, to be supplied to the cue head 10 through the switching circuit 14. The cue head 10 records the cue signal on the cue track provided on the magnetic tape.

When the stop mode is released, the switching circuit 14 is switched to the amplifier 15. Then the cue head 10 picks up the cue signal from the cue track on the magnetic tape. The cue signal is supplied to the amplifier 15 through the switching circuit 14 to be amplified therein. The amplified cue signal is waveform-shaped by the waveform shape circuit 16, to be supplied to the pulse repetition measuring circuit 103. The pulse repetition measuring circuit 103 measures the pulse repetition of the reproduced cue signal, to supply the result of the measurement to the control circuit 101, while supplying the measured pulse signal to the pulse number counter circuit 102. The pulse number counter circuit 102 counts the pulse number of the reproduced cue signal. Then the pulse train decision circuit 104 decides a recording starting position based on the pulse repetition and the pulse number of the reproduced cue signal and the pulse train in the recording of the cue signal on the cue track of the magnetic tape.

Figure 3:
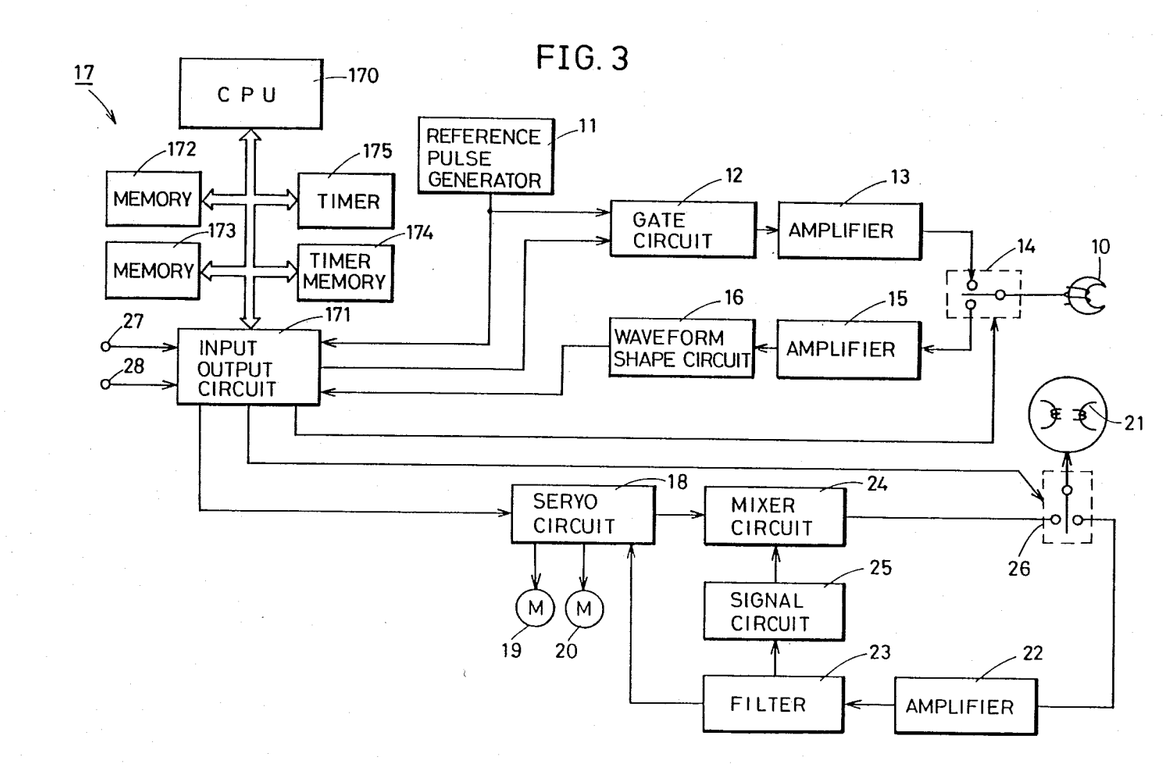
FIG. 3 is a more definite block diagram showing the embodiment of the present invention.

FIG. 3 is a definite block diagram of the present embodiment. In FIG. 3, the control circuit 101, the pulse number counter circuit 102, the pulse repetition measuring circuit 103 and the pulse train decision circuit 104 as shown in FIG. 2 are replaced by a microcomputer 17, and other components are identical to those shown in FIG. 2. The microcomputer 17 includes a CPU 170, an input/output circuit 171, memories 172 and 173, a timer memory 174 and a timer circuit 175, which are connected with each other by a data bus. The input/output circuit 171 receives a pause signal through an input terminal 27 as well as a head switching signal through an input terminal 28. The input/output circuit 171 further receives pilot signals of a reference frequency from a reference pulse generator 11. The input/output circuit 171 supplies a gate circuit 12 with a gate signal for opening the gate thereof and further supplies changeover switches 14 and 26 with switching signals for switching the same respectively, while supplying a servo circuit 18 with a command signal for rotating a capstan motor 19 and a reel motor 20 respectively in the forward or reverse directions.

Figure 4A:
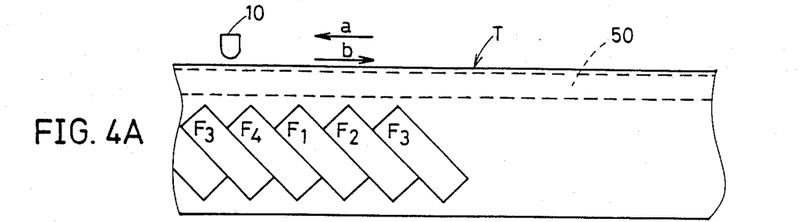
FIGS. 4A to 4D are illustrations showing linked recording operation in the embodiment of the present invention.
Figure 4B:
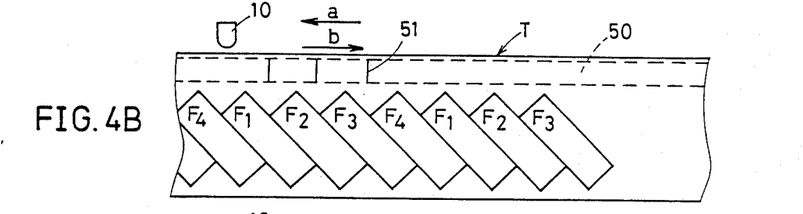
Figure 4C:
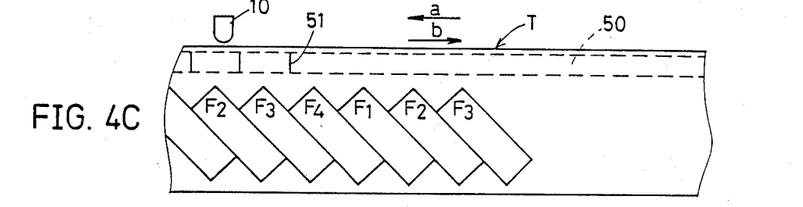
Figure 4D:
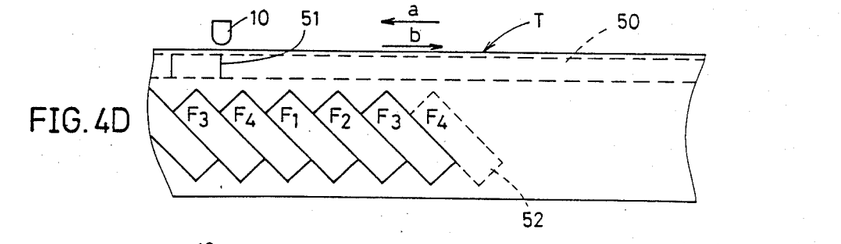
Figure 5:
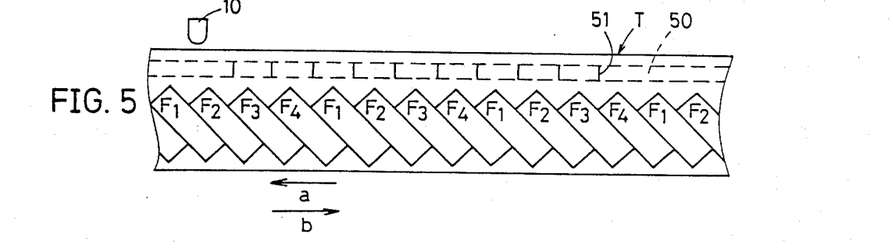
FIGS. 5 and 6 are illustrations showing patterns on a magnetic tape in the embodiment of the present invention.
Figure 6:
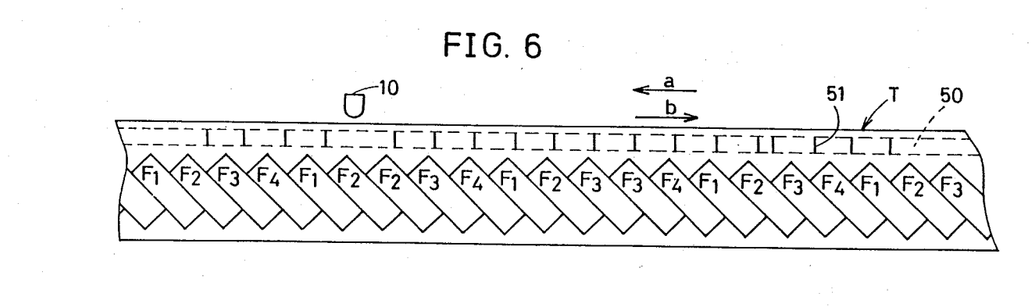
Figure 7:
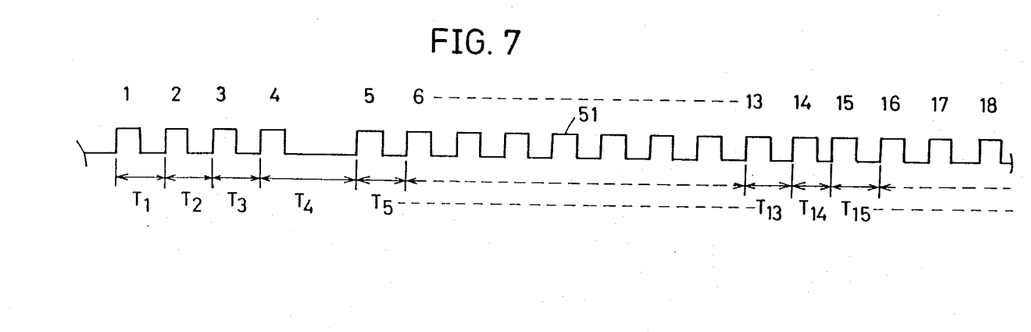
FIG. 7 is a waveform diagram of a signal obtained from a cue track in reproduction of the magnetic tape.
Figure 8A:
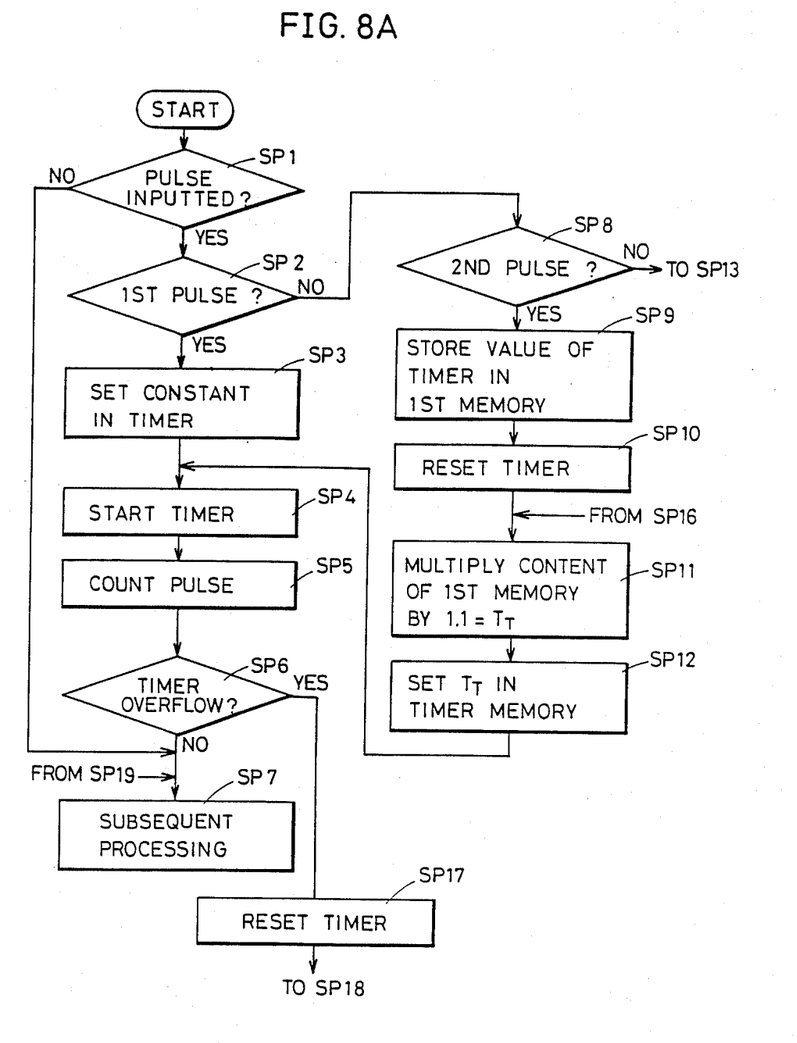
FIGS. 8A and 8B are flow charts for explaining steps of program search operation.
Figure 8B:
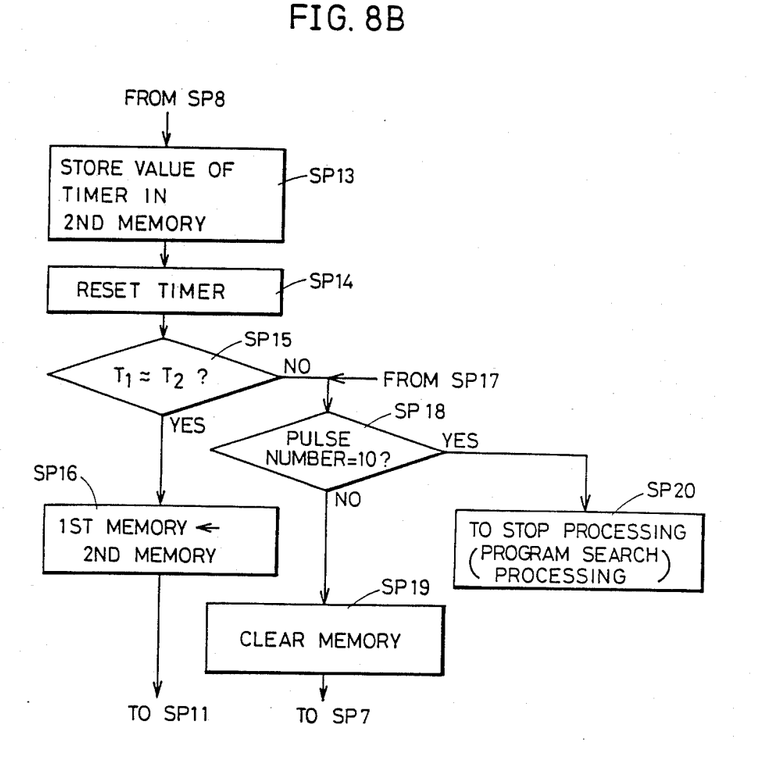

FIGS. 4A to 4D are illustrations for showing linked recording operation in the present embodiment and FIGS. 5 and 6 are illustrative of patterns on the magnetic tape in the present embodiment, while FIG. 7 is a waveform diagram of the signal obtained from a cue track upon reproduction of the magnetic tape and FIGS. 8A and 8B are flow charts showing steps of program search operation.

Referring now to FIGS. 3 to 8B, operation in the present embodiment is definitely described.

In the recording mode, as shown in FIG. 4A, pilot signals of frequencies $f_1$ to $f_4$ circulate in superposition with video signals to be recorded through a video head 21 in a similar manner to that hereinabove described with reference to FIG. 2.

When a pause signal is inputted in the microcomputer 17 through the input terminal 27 in this condition, the microcomputer 17 is synchronized with switching of the head switching signal received in the input terminal 28, to supply a command signal to the servo circuit 18 upon completion of the proceeding recording in the video track. In response to this, the servo circuit 18 reversely rotates the capstan motor 19 and the reel motor 20 based on the command signal, thereby to reversely transfer a magnetic tape T in the direction shown by an arrow b in FIG. 4A. Simultaneously, the microcomputer 17 supplies the gate circuit 12 with a gate signal to open the gate thereof while outputting a switching signal to switch the changeover switch 14 to the recording side.

Upon receiving the gate signal, the gate circuit 12 outputs pulse signals generated from a reference pulse generator 11 during the gate period. These pulse signals are amplified by an amplifier 13, to be supplied to a cue head 10 through the changeover switch 14. As shown in FIG. 4B, the cue head 10 records a pulse train 51 formed by the pulse signals on a cue track 50 provided on the magnetic tape T separately from the video tracks. The microcomputer 17 counts the number of the pulse signals generated from the reference pulse generator 11, to close the gate of the gate circuit 12 when the counted pulse signals reach a predetermined number, e.g., three (reference frequency of 60 Hz). At this time, the changeover switch 26 is switched to the reproducing side, whereby no recording is made with respect to the video signals superposed with the pilot signals by the video head 21. When, in the aforementioned operation, a predetermined amount of the magnetic tape T is reversely transferred, the capstan motor 19 and the reel motor 20 are temporarily stopped to be in a recording stand-by state.

When the temporary stoppage is released, the microcomputer 17 supplies the servo circuit 18 with a command signal for releasing the temporary stoppage. In response to this, the servo circuit 18 rotates the capstan motor 19 and the reel motor 20 in the reverse direction, whereby the magnetic tape T is transferred in the forward direction. At this time, the video head 21 picks up the pilot signals recorded on the magnetic tape T in superposition with the video signals. The video signals superposed with the picked-up pilot signals are amplified in an amplifier 22, to be supplied to a filter 23, which in turn separates the pilot signals from the video signals. The separated pilot signals are supplied to the servo circuit 18. The servo circuit 18 controls the speed of rotation of the capstan motor 19 so that, e.g., the pilot signal of the frequency $f_1$ reproduced from the magnetic tape T and the pilot signal of frequency $f_1$ to be newly recorded thereon match in frequency and in phase with each other, whereby the speed of travelling of the magnetic tape T is controlled.

Simultaneously with the aforementioned operation, the microcomputer 17 further switches the changeover switch 14 to the reproducing side. Then, as shown in FIG. 4C, the amplifier 15 is supplied with the pulse train 51 recorded on the cue track 50 on the magnetic tape T as picked up by the cue head 10. The pulses picked up as the cue signal are amplified in the amplifier 15 and waveform-shaped by the waveform shape circuit 16 to be supplied to the microcomputer 17.

The microcomputer 17 counts the number of the reproduced pulses, to switch the changeover switch 26 to the recording side in synchronization with a head switching signal inputted in the head input terminal 28 when the reproduced pulses from the cue head 17 reach a predetermined number, i.e., the number of the pulses recorded on the cue track 50 when the magnetic tape T is reversely transferred as shown in FIG. 4D. Consequently, the pending recording operation is re-started to record the video signals superposed with the pilot signals on another video track 52 as shown in FIG. 4D.

The above operation is performed with respect to linked recording. Therefore, the pulse train 51 recorded on the cue track 50 is indicative of the pending recording starting position. Further, although the above description has been made with respect to a case of recording →pause →recording, the aforementioned operation is continuously performed also in a case where the mode is directly shifted from the stop mode to the recording mode, excepting a temporary stand-by state after reverse transfer of the magnetic tape T.

Description is now made on program search operation for the recording starting position. It is assumed here that the program search is performed when the mode is shifted from the stop state to the recording state, and no program search operation is made in the case of recording →pause →recording. It is further assumed that the pulse number to be recorded in reverse transfer of the magnetic tape T is ten in the case of stop →recording, and that in the case of recording →pause →recording is four, while the pulse spacing thereof is stated as 16.6 m sec respectively.

In the case of FIG. 5, the pulse number of the pulse train 51 recorded on the cue track 50 is ten. In the state as shown in FIG. 5, the program search for the recording starting position is enabled by reproducing the pulse train 51 by the cue head 10 in fast forwarding and rewinding of the magnetic tape T, thereby counting the pulse number of the reproduced pulse train 51 by the microcomputer 17. However, unless the pulse train 51 is always regularly in line as shown in FIG. 5, the aforementioned program search cannot be reliably performed since the pulse train 51 on the cue track 50 is made irregular when the cases of stop →recording or recording →pause →recording are repeated or mixed.

With performance based on the pulse number and the pulse repetition of the pulse train 51, the program search can reliably be made according to the present embodiment even if the pulse train 51 is irregular. The program search operation is hereafter described in detail.

In FIG. 6, there is shown, as an example, the format on the magnetic tape T in shifting of recording →pause →recording →stop →recording →pause →recording within a short period of time.

Referring to FIG. 7 and flow charts as shown in FIGS. 8A and 8B, program search in fast forward operation of the magnetic tape T is now described. It is assumed that the pulse train 51 as shown in FIG. 6 is reproduced by the cue head 10, to be inputted in the microcomputer 17 through the amplifier 15 and the waveform shape circuit 16. FIG. 7 shows the input waveform of the pulse train 51 as inputted in the microcomputer 17.

Simultaneously with counting of the pulse number of the aforementioned reproduced pulse train 51, the microcomputer 17 measures the interval (time spacing) between each adjacent pulses of the pulse train 51. More specifically, the CPU 170 included in the microcomputer 17 determines at a step SP1 whether or not a pulse is inputted, and if the determination is yes, then determines whether or not the inputted pulse is the first one in the pulse train 51 at a step SP2. If the determination is yes, the CPU 170 sets a predetermined constant in a timer circuit 175 at a step SP3, and makes the timer circuit 175 start counting the time at a step SP4. Further, at a step SP5, the CPU 170 counts the pulse number of the pulse train 51. At a step SP6, the CPU 170 determines whether or not the count value in the timer circuit 175 reaches the predetermined constant. If the count value in the timer circuit 175 has not reached the constant the process is advanced to a step SP7 for performing subsequent processing. In the present case, the process is returned to the step SP1 as the subsequent processing.

When the second pulse of the pulse train 51 is inputted in the microcomputer 17, the CPU 170 determines at the step SP2 that the inputted pulse is not the first one, whereby the process is advanced to a step SP8. Upon making a determination at the step SP8 that the second pulse is inputted, the CPU 170 stores the count value in the timer circuit 175, i.e., the spacing value between the first and second pulses as indicated by symbol $T_1$ in FIG. 7 in the memory 172 at a step SP9. Then, at a step SP10, the CPU 170 resets the timer circuit 175. At a step SP11, the CPU 171 multiplies the spacing value $T_1$ as stored in the memory 172 by 1.1. Such multiplication is carried out for rendering sufficient room for the spacing value $T_1$ in consideration of dispersion in time for recording or reading the pulse train 51 in or from the magnetic tape T and dispersion in the tape speed.

A spacing value $T_T$ thus obtained by the multiplication by 1.1 in the aforementioned manner is stored in the timer memory 174 at a step SP12. Then the process is returned to the step SP4 to re-start the timer circuit 175 while simultaneously counting the second pulse at the step SP5.

The aforementioned operation is repeated, and upon inputting of the third pulse from the pulse train 51, the spacing between the second and third pulses can be recognized from the count value in the timer circuit 175. At a step SP13, the CPU 170 stores the spacing value $T_2$ between the second and third pulses in the memory 173, and then resets the timer circuit 175 at a step SP14.

At a step SP15, the CPU 170 compares the contents of the memories 172 and 173, to determine whether or not the spacing values $T_1$ and $T_2$ are correlated with each other. Since the spacing values $T_1$ and $T_2$ are substantially identical with each other in the present case, the determination is yes and the CPU 170 transfers the spacing value $T_2$ stored in the memory 173 to the memory 172 at a step SP16. Then the process is returned to the step SP11, at which the spacing value $T_2$ is multiplied by 1.1 to obtain the value $T_T$ similarly to the case of the inputting of the first pulse, and at the step SP12, the multiplied spacing value $T_T$ is stored in the timer memory 174. The process is again returned to the step SP4 to re-start the timer circuit 175, and count the pulse number at the step SP5.

Performed thereafter is operation similar to that in inputting of the third pulse, and when, during measurement of a spacing value $T_4$, a determination is made at the step SP6 that the spacing value $T_4$ is larger than the value $T_T$ ($T_4 \times 1.1$), the CPU 170 determines that the subsequently inputted pulse is out of the pulse train theretofore counted, to reset the timer circuit 175 thereby stopping the pulse counting operation and the timer operation. Then the process is advanced to a step SP18, at which a determination is made as to whether or not the pulse number theretofore counted by the timer circuit 175 reaches ten. Since, in the present case, the counted pulse number is four, a determination is made that the position is for starting recording in the case of pause →recording, whereby no program search is performed and the memories 172 and 173 are cleared. The process is returned to the step SP7, to perform the subsequent processing. The operation from inputting of the fifth pulse to that of the fourteenth pulse is performed in a similar manner to that in the inputting of the first to fourth pulses.

When, upon inputting of a fifteenth pulse, spacing values $T_{13}$ and $T_{14}$ are compared with each other, the spacing value $T_{14}$ is smaller than the value $T_{13}/2$ Therefore, the CPU 170 determines at the step SP15 that the inputted fifteenth pulse is not in the train of the theretofore counted fifth to fourteenth pulses. Since, in this case, the counted pulse number is ten, which is indicative of the position of performance of stop —recording, the mode is shifted at a step SP20 from the fast forward mode to the stop mode for performing the program search operation, thereby to stop travelling of the magnetic tape T.

When a subsequent pulse is inputted within a range smaller than the predetermined time value as set in the timer memory 174 as in the case of inputting of the fifteenth pulse, the CPU 170 clears the count value of the pulses as theretofore stored to perform processing of the subject pulse which is determined to be inputted as a first pulse. Thus, the train of the fifteenth to eighteenth pulses is processed in the same manner as the train of the first to fourth pulses.

Thus, since, according to the present invention, the pulse number and the pulse repetition of the pulse train 51 as recorded on the cue track 50 are utilized to detect a position different from the pulse train theretofore counted, a determination as to a program search signal is enabled even when the tape speed is made irregular upon fast forwarding and rewinding of the magnetic tape. Further, no additional structural elements are required since the pulse train employed in the linked recording operation is commonly used for the determination.

Although the frequency of the pulse train 51 to be recorded on the cue track 50 is selected to be 60 Hz and the pulse numbers to be recorded are selected in two sorts of numbers of four and ten in the above description of the preferred embodiment, the values are not restricted to the same and may be selected in a desired frequency value and in at least three different pulse numbers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic video reproducer comprising:
   a video head for recording video signals on video tracks of a magnetic tape as well as picking up recorded video signals;
   video signal recording means for recording video signals and a plurality of pilot signals on said magnetic tape through said video head in a recording mode;
   a cue head for recording a cue signal on a cue track provided on said magnetic tape separately from said video tracks as well as for picking up the recorded cue signal;
   first tape travel control means for controlling travelling of said magnetic tape based on said pilot signals picked up from said magnetic tape by said video head in a reproducing mode;
   second tape travel control means for controlling travelling of said magnetic tape by stopping recording of said video signals and said pilot signals so as to transfer said magnetic tape in a reversed direction from the position of stoppage of said magnetic tape in a stop mode including a pause mode;
   cue signal recording control means for recording said cue signal in the form of a pulse train comprising a predetermined number of pulses on said cue track of said magnetic tape by said cue head in response to reverse travelling of said magnetic tape controlled by said second tape travel control means; and
   program search control means for transferring said magnetic tape in the forward direction upon releasing of said stop mode, making said cue head pick up said pulse train recorded on said cue track in response to a determination of matching of said pilot signals, and re-starting a recording operation when the number of said reproduced pulses is correlated with the number of said pulses recorded on said cue track during said reverse transfer of said magnetic tape.

2. A magnetic video reproduced in accordance with claim 1, wherein
   said cue signal recording control means includes means for recording a pulse train of a first number on said cue track when the mode is again shifted to said recording mode after shifting from said recording mode to said pause mode as well as recording a pulse train of a second number which is different from said first number when the mode is shifted from said stop mode to said recording mode, and
   said program search control means includes means not performing program search when the number of said reproduced pulses is said first number while performing program search when the number of said reproduced pulses is said second number.

3. A magnetic video reproducer as recited in claim 1 wherein said cue signal recording control means includes means for recording said cue signal at predetermined program locations.

4. A magnetic video reproducer as recited in claim 3 wherein said program search control means is further operable for searching for and locating predetermined program locations identified by the recorded cue signals.

5. A magnetic video reproducer as recited in claim 1 wherein said program search control means is further operable for searching for and locating predetermined program locations identified by the recorded cue signals.

6. A magnetic video reproducer comprising:
   a video head for recording video signals on video tracks of a magnetic tape as well as picking up recorded video signals;
   video signal recording means for recording combined video signals and a plurality of pilot signals on the tape through said video head in a recording mode;
   a cue head for recording a cue signal on a cue track provided on said magnetic tape separately from said video tracks as well as for picking up the recorded cue signal;
   first tape travel control means for controlling travelling of said magnetic tape based on said pilot signals picked up from said magnetic tape by said video head in a reproducing mode;
   second tape travel control means for controlling travelling of said magnetic tape by stopping recording of said video signals combined with said pilot signals so as to transfer said magnetic tape in a reverse direction from the position of stoppage of said magnetic tape in a stop mode including a pause mode;
   cue signal recording control means for recording said cue signal in the form of a pulse train comprising a predetermined number of pulses on said cue track of said magnetic tape by said cue head in response to reverse travelling of said magnetic tape controlled by said second tape travel control means; and
   program search control means for transferring said magnetic tape in the forward direction upon releasing of said stop mode, making said cue head pick up said pulse train recorded on said cue track in response to a determination of matching of said pilot signals, and re-starting a recording operation when the number of said reproduced pulses is correlated with the number of said pulses recorded on said cue track during said reverse transfer of said magnetic tape.

7. A magnetic video reproducer as recited in claim 6 wherein said cue signal recording control means includes means for recording said cue signal at predetermined program locations.

8. A magnetic video reproducer as recited in claim 7 wherein said program search control means is further operable for searching for and locating predetermined program locations identified by the recorded cue signals.

9. A magnetic video reproducer as recited in claim 6 wherein said program search control means is further operable for searching for and locating predetermined program locations identified by the recorded cue signals.

10. A magnetic video reproducer comprising:
    a video head for recording video signals on video tracks of a magnetic tape as well as picking up recorded video signals;

video signal recording means for recording said video signals on said magnetic tape through said video head in a recording mode;

a cue head for recording a cue signal on a cue track provided on said magnetic tape separately from video tracks as well as picking up the recorded cue signal;

first tape travel control means for controlling travelling of said magnetic tape;

second tape travel control means for controlling travelling of said magnetic tape by stopping recording of said video signals so as to transfer said magnetic tape in a reverse direction from the position of stoppage of aid magnetic tape in a stop mode including a pause mode;

cue signal recording control means for recording said cue signal in the form of a pulse train comprising a predetermined number of pulses on said cue track of said magnetic tape by said cue head in response to reverse travelling of said magnetic tape controlled by said second tape travel control means; and program search control means for transferring said magnetic tape in the forward direction upon releasing of said stop mode, making said cue head pick up said pulse train recorded on said cue track, and re-starting a recording operation when the number of said reproduced pulses is correlated with the number of said pulses recorded on said cue track during said reverse transfer of said magnetic tape.

11. A magnetic video reproducer as recited in claim 10 wherein said cue signal recording control means includes means for recording said cue signal at predetermined program locations.

12. A magnetic video reproducer as recited in claim 11 wherein said program search control means is further operable for searching for and locating predetermined program locations identified by the recorded cue signals.

13. A magnetic reproducer as recited in claim 10 wherein said program search control menas is further operable for searching for and locating predetermined program locations identified by the recorded cue signals.

* * * * *